US006683272B2

(12) United States Patent
Hammer

(10) Patent No.: US 6,683,272 B2
(45) Date of Patent: Jan. 27, 2004

(54) PLASMA SOURCE FOR SPECTROMETRY

(75) Inventor: Michael R. Hammer, Sassafras (AU)

(73) Assignee: Varian Australia PTY LTD, Mulgrave (AU)

( * ) Notice: Subject to any disclaimer, the term of this patent is extended or adjusted under 35 U.S.C. 154(b) by 0 days.

(21) Appl. No.: 10/312,962

(22) PCT Filed: Jul. 4, 2001

(86) PCT No.: PCT/AU01/00805

§ 371 (c)(1), (2), (4) Date: Dec. 31, 2002

(87) PCT Pub. No.: WO02/04930

PCT Pub. Date: Jan. 17, 2002

(65) Prior Publication Data

US 2003/0111445 A1 Jun. 19, 2003

(51) Int. Cl.[7] ........................ B23K 10/00

(52) U.S. Cl. ........................ 219/121.48; 219/121.43; 219/121.41; 219/690; 118/723 MW; 156/345.36

(58) Field of Search ........................ 219/121.4, 121.41, 219/121.43, 121.48, 121.52, 121.54, 74, 75, 690, 696; 204/298.38; 118/723 MW; 156/345.36

(56) References Cited

U.S. PATENT DOCUMENTS

| | | | | | |
|---|---|---|---|---|---|
| 4,611,108 | A | * | 9/1986 | Leprince et al. ....... | 219/121.52 |
| 5,349,154 | A | * | 9/1994 | Harker et al. ............... | 117/102 |
| 5,734,143 | A | * | 3/1998 | Kawase et al. ........ | 219/121.43 |
| 5,847,355 | A | * | 12/1998 | Barmatz et al. ....... | 219/121.59 |
| 6,222,185 | B1 | * | 4/2001 | Speakman et al. .......... | 250/288 |

FOREIGN PATENT DOCUMENTS

| | | |
|---|---|---|
| WO | 0060910 | * 10/2000 |

* cited by examiner

*Primary Examiner*—Mark Paschall
(74) *Attorney, Agent, or Firm*—Bella Fishman

(57) ABSTRACT

A plasma source for a spectrometer for spectrochemical analysis of a sample is characterized by use of the magnetic field component of applied microwave energy for exciting a plasma. The source includes a waveguide cavity (10) fed with $TE_{10}$ mode microwave power. A plasma torch (16) passes through the cavity (10) and is axially aligned with a magnetic field maximum (18) of the applied microwave electromagnetic field. Magnetic field concentration structures such as triangular section metal bars (20) may be provided. In an alternative embodiment a resonant iris may be provided within a waveguide and the plasma torch positioned relative thereto such that the microwave electromagnetic field at the resonant iris excites the plasma.

33 Claims, 4 Drawing Sheets

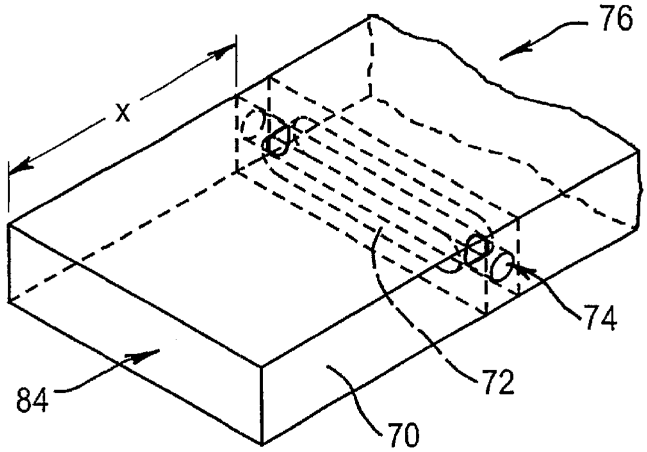
FIG 6
FIG 7
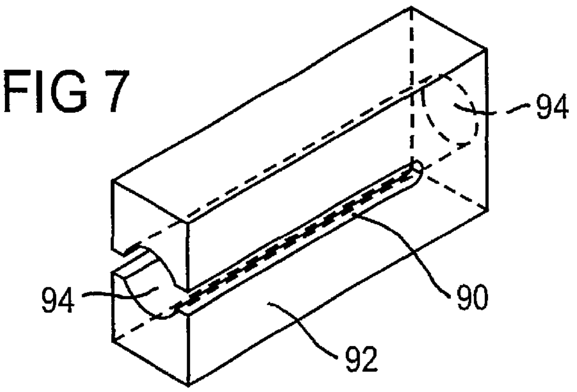
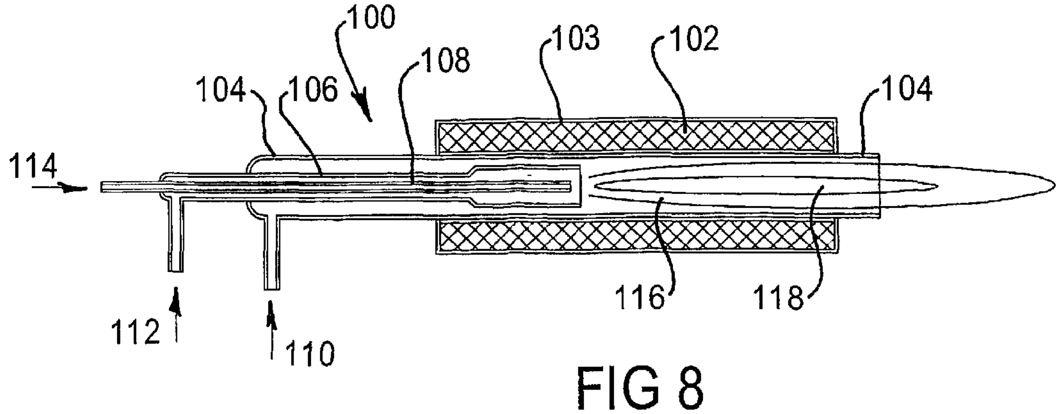
FIG 8

PLASMA SOURCE FOR SPECTROMETRY

TECHNICAL FIELD

The present invention relates to spectrometry and in particular to a method and apparatus for producing a plasma by microwave power for heating a sample for spectrochemical analysis, for example by optical emission spectrometry or mass spectrometry.

BACKGROUND

It is known to excite a plasma to heat a sample for optical or mass spectrometry via an axial electric field (that is, axially of the plasma torch) using frequencies in the microwave region (typically 2455 Mhz). Examples of known microwave induced plasma (MIP) spectrometers, as discussed in U.S. Pat. No. 4,902,099 by Okamoto et al, employ a Beenakker cavity, which utilises a $TM_{010}$ cavity, or a "Surfatron". These suffer from the disadvantage that the plasma forms in the form of a ball or cylinder. Sample injected into such a plasma is heated directly by the microwave energy (principally by electron bombardment). This excitation is very vigorous and leads to the production of undesired interferences. Also, direct interaction between the microwave energy and a changing sample load can destabilise the plasma. A better approach is to form the plasma in the form of an annulus or hollow tube with the sample injected into the hollow core. The electrical energy is dissipated in the outer layer which consists of pure support gas, and the sample is heated from this outer layer via thermal conduction and radiation. This isolates the sample from the electrical energy and results in more gentle excitation.

The Okamoto et al patent discloses an MIP spectrometer which provides a plasma having improved characteristics. The Okamoto et al spectrometer uses an antenna having multiple parallel slots arranged around the circumference of a conducting tube which contains a plasma torch. The antenna is inside a cavity supplied with microwave power of $TE_{01}$ mode.

The present invention in seeking to provide a relatively simple and inexpensive method and apparatus for producing a plasma for spectrometry which is in the form generally of a hollow cylinder, provides an alternative to the Okamoto et al arrangement.

SUMMARY OF THE INVENTION

Accordingly, in a first aspect the invention provides a method of producing a plasma for spectrochemical analysis of a sample comprising

- supplying a plasma forming gas to a plasma torch,
- applying microwave power to the plasma torch, and
- relatively positioning the plasma torch to axially align it with a magnetic field maximum of the microwave electromagnetic field, wherein the applied microwave power is such as to maintain a plasma of the plasma forming gas for heating a sample entrained in a carrier gas for spectrochemical analysis of the sample.

In a second aspect, the invention provides a plasma source for a spectrometer comprising

- microwave generation means for generating microwave power,
- a waveguide for receiving and supplying the microwave power,
- a plasma torch having passages for supply of respectively at least a plasma forming gas and a carrier gas with entrained sample,
- wherein the plasma torch is positioned relative to the waveguide such that it is substantially axially aligned with a magnetic field maximum of the microwave electromagnetic field for excitation of a plasma of the plasma forming gas for heating the sample for spectrochemical analysis.

An axial magnetic field induces tangential electric fields which in turn induce circulating currents in the conducting plasma. These circulating currents induce a magnetic field which opposes the applied field and shields the core of the plasma region from the applied field. As a consequence, most of the current flows in the outer layer of the plasma creating the cylindrical shape required. The effect is known and is often referred to as the "skin effect".

A considerable field strength is required in order to initiate and sustain the required plasma. This field strength is more readily achieved with a moderate sized microwave power source by use of a resonant cavity. Such a cavity stores energy at the resonant frequency and thus raises the peak field strength available for the same level of supplied microwave power. The degree to which this occurs is defined by the quality factor or Q of the cavity and Q's>=10 have proven effective. A particularly preferred requirement of a cavity for this invention is that it produce a magnetic field maximum in an unencumbered region of space so that a plasma torch can be inserted at the magnetic field maximum. Many possible cavities exist and are described in appropriate microwave texts, for example "Microwave Engineering" by Peter A Rizzi ISBN 0–13-586702-9 1988 Prentice Hall.

A simple yet effective approach is to use a cavity formed from a length of waveguide short circuited at one end and fed with microwave power via a suitable iris from the other end. Such a cavity operates in the $TE_{10}$ mode (where n is an integer that depends on cavity length). This also has the advantage of being readily fed with microwave power transmitted in the $TE_{10}$ mode which is the most common and simplest way of transmitting microwave power along a waveguide. Cavities with a low Q offer the advantage of broad and therefore simple tuning. However they may not offer enough increase in magnetic field strength for optimum maintenance of the desired plasma. To this end magnetic field concentration structures may be employed within the cavity to further increase the peak magnetic field strength. In the case of a cavity formed by a waveguide which is short-circuited at one end, these can be conveniently provided by conducting bars (eg: metallic bars) placed in contact with each side of the inside wall of the cavity so as to reduce the cavity height in parallel alignment with the plasma torch. Rectangular bars may be used but preferably the height reduction is made more gradually for example by use of bars with a triangular cross-section with the apexes directed inwardly.

Alternatively a resonant iris may be provided within the waveguide and a plasma torch positioned relative to this iris such that the microwave electromagnetic field at the resonant iris excites the plasma.

Preferably the resonant iris is provided by a structure which defines an opening to provide the resonant iris by reducing a width and a height of the waveguide. The structure may be a metal section having a thickness dimension along the waveguide with the plasma torch accommodated within a through hole of the metal section which intersects the resonant iris opening.

According to a third aspect, the invention also provides a waveguide for a microwave induced plasma source for spectrochemical analysis of a sample, wherein the waveguide is dimensioned to operate in the $TE_{10}$ mode and includes apertures for accommodating a plasma torch, wherein the apertures are located such that in use a plasma torch located in the waveguide and extending through said apertures will be axially aligned with a magnetic field maximum of the microwave electromagnetic field.

For a better understanding of the invention and to show how it may be carried into effect, embodiments thereof will now be described by way of non-limiting example only, with reference to the accompanying drawings.

BRIEF DESCRIPTION OF THE DRAWINGS

FIG. 6 illustrates an embodiment of the invention employing a resonant iris in a waveguide.

FIG. 7 illustrates portion of another resonant iris for use in an embodiment of the invention.

FIG. 8 is a cross-sectional view of a plasma torch within a resonant iris within a waveguide according to an embodiment of the invention.

DESCRIPTION OF PREFERRED EMBODIMENTS

Figure 1:
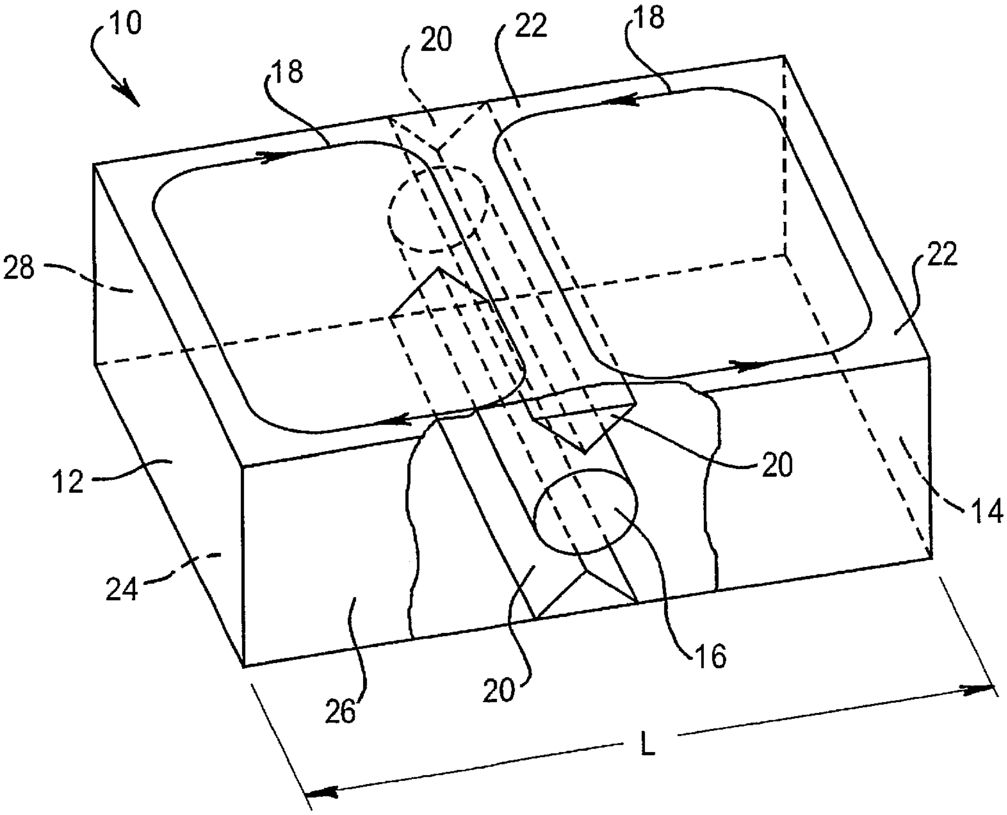
FIG. 1 is a schematic diagram of an embodiment of the invention in which a waveguide cavity is shown partially broken away to illustrate other components.

An embodiment of the invention as illustrated by FIG. 1 comprises a microwave waveguide which is a rectangular cavity 10 within which is positioned a plasma torch 16 (which is diagrammatically represented as a cylinder).

The rectangular cavity 10 operates in the $TE_{10n}$ mode. It is short-circuited at one end 12 and fed with $TE_{10}$ mode microwave power via a suitable reactive discontinuity such as an iris or post (not shown) from the other end 14. If the electrical length L of the section of waveguide 10 with the iris loading is made n/2 wavelengths long (where n is an integer>=1) it will form a resonant cavity. Electric field maxima will occur every (m/2+¼) wavelengths from the short-circuited end 12 (where m is an integer between 0 and n−1) and magnetic field maxima will occur every m/2 wavelengths from the short circuited end 12. The shortest cavity length which produces a magnetic field maximum in an unencumbered region is for n=2 ie: L=1 wavelength and the cavity mode becomes $TE_{102}$. In a cavity of this length there is a magnetic field maximum ½ wavelength from the short-circuited end 12. Representative magnetic field lines are referenced 18 in FIG. 1. By placing a plasma torch 16 substantially at this location, as shown in FIG. 1, axial magnetic excitation of a plasma forming gas supplied to the torch can be readily achieved. The plasma torch 16 is only diagrammatically represented in FIG. 1 as a cylinder because plasma torch structures for spectrometers are well known. Commonly in plasma torches at least two concentric tubes (typically of quartz) are used. A carrier gas with entrained sample normally flows through the innermost tube and a separate plasma sustaining and torch cooling gas flows in the gap between the two tubes. Typically the plasma forming and sustaining gas will be an inert gas such as argon and arrangements are provided for producing a flow of this gas conducive to forming a stable plasma having a hollow core, and to keeping the plasma sufficiently isolated from any part of the torch so that no part of the torch is overheated. For example the flow may be injected radially off axis so that the flow spirals. This latter gas flow sustains the plasma and the sample carried in the inner gas flow is heated by radiation and conduction from the plasma. An example of a suitable plasma torch is described in detail hereinbelow with reference to FIG. 8.

Magnetic field concentration structures, namely metal bars 20 are affixed to and in intimate contact with (with reference to the orientation shown in FIG. 1) the top 22 and bottom 24 inside surfaces of the cavity 10 but do not contact the side walls 26 and 28. These structures 20 direct more of the magnetic flux through the region occupied by the torch 16. As described hereinbefore, the bars 20 may be rectangular in cross section but preferably, the change in cavity height due to the bars 20 is made more gradually. This may be achieved by making the cross section of the bars triangular, or in the form of the chord of a circle, or any other shape which changes thickness progressively across the width of the bar to a maximum at the centre of the width.

The iris at the end 14 may be a capacitive iris (i.e. a thin plate which locally reduces the height of the waveguide), or an inductive iris (i.e. a thin plate which locally reduces the width of the waveguide or a post spanning the height of the waveguide), or a self resonant iris (i.e. a plate which locally reduces both the height and the width of the waveguide). Preferably an inductive iris is used.

Plasma ignition may be facilitated by seeding the high magnetic field region with some ions. These can be conveniently generated by a localised breakdown of the plasma forming gas, for example via an electrical spark passing through the torch 16 in the region of high magnetic field. This method of plasma ignition is known.

For a plasma torch having an inner diameter of 11 mm, microwave power levels in the range of a few hundred watts to around 1 kW readily sustain the plasma discharge in argon or nitrogen. Smaller torches would require less power. Typical dimensions for an aluminium waveguide 10 are 80 mm×40 mm outside dimensions with a 3 mm thickness wall. The opening in the inductive iris end 14 is about 40 mm symmetrically positioned across the 80 mm dimension. Typical field concentrator bars which are triangular in cross section are 60 mm wide at the base, 9 mm high at the apex and 70 mm long and the cavity length is approximately 216 mm long.

Microwave generation means such as a magnetron 30 (see FIG. 2) may feed the microwave power into a feeder waveguide 32, also operating in the $TE_{10}$ mode. A resonant cavity 10 (as in FIG. 1) is attached to the feeder waveguide 32 via respective clamping flanges 34 and 36, between which a plate 38 providing the preferred inductive iris is clamped.

Figure 3:
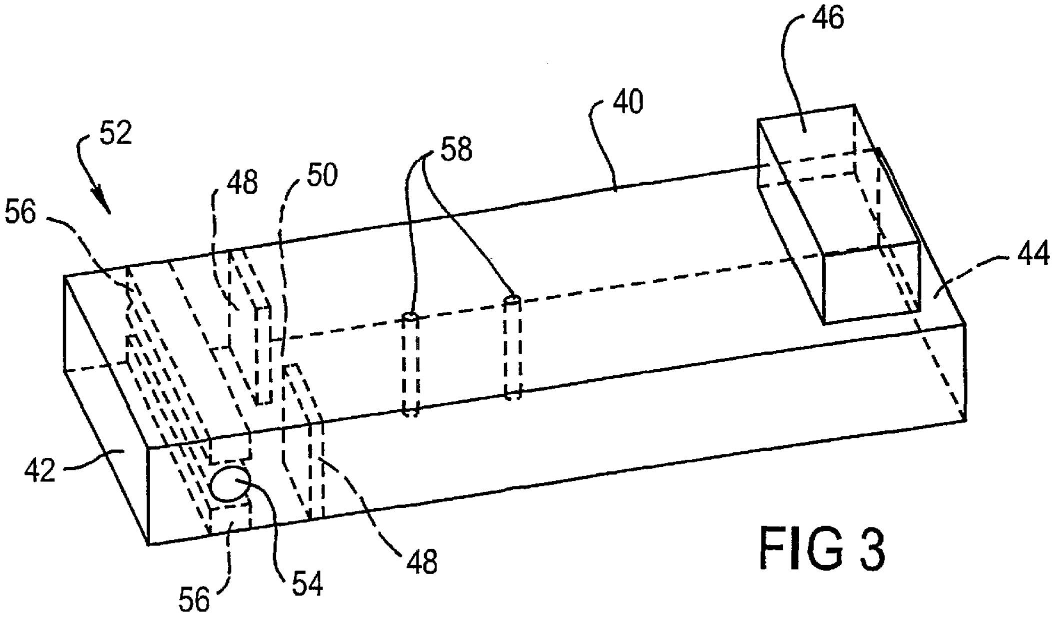
FIG. 3 is another embodiment of the invention.

FIG. 3 shows an embodiment which is realised using a single length of waveguide. In this embodiment a length of rectangular waveguide 40 is short-circuited at both ends 42, 44 and a magnetron 46 is mounted the appropriate distance from one short-circuited end 44. Two slots are formed in the waveguide 40 one electrical wavelength from the other short-circuited end 42 and metal plates 48 are welded into these slots to form the required inductive iris 50. The portion of waveguide 40 between end 42 and plates 48 forms a resonant cavity 52. As in the FIG. 1 embodiment, a plasma torch 54 (also shown diagrammatically as a cylinder) is located substantially half a wavelength from the short-circuited end of the cavity 52 for excitation of a plasma in a plasma forming gas by the magnetic field of $TE_{10}$ mode microwave power supplied by waveguide 40. Magnetic field concentration bars 56 are also included. Impedance matching stubs 58 may be included in the waveguide section 40. A tuning stub may be incorporated into cavity 52 if necessary, (for example in face 42 (not shown).

Figure 4:
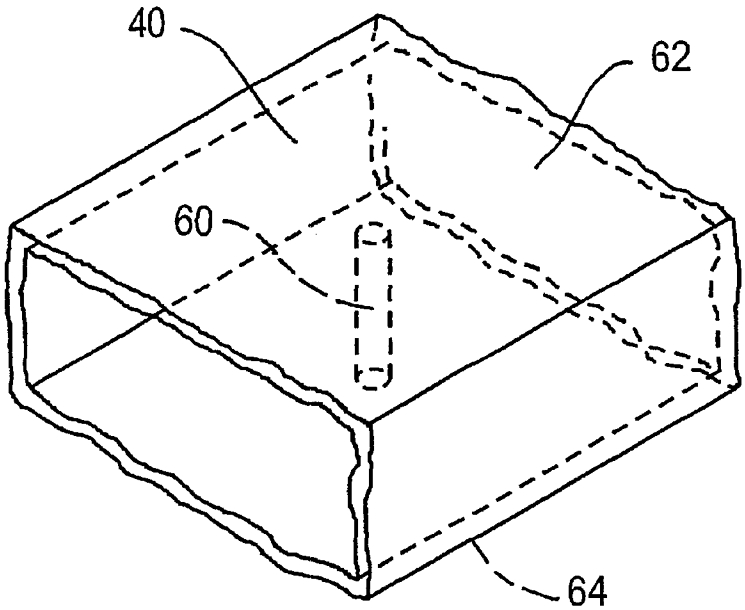
FIG. 4 shows portion of a waveguide for supplying microwave power for an embodiment of the invention.

As an alternative to the plates 48 providing an iris 50 as in the FIG. 3 embodiment, a post 60 may be provided as shown in FIG. 4. Post 60 is a metal rod which must electrically contact the top wall 62 and bottom wall 64 inner surfaces of the waveguide 40. Provision of a post 60 is simpler and cheaper than the plates 48 of FIG. 3 as it involves merely drilling a hole through the top and bottom walls 62, 64, inserting the metal rod 60 and either bolting or welding it in position. Example dimensions for a waveguide 40 as in FIG. 4 are interior dimensions 34 mm height×74 mm width, post 60 of 3–4 mm diameter passing along the 34 mm height and positioned in the middle of the 74 mm wide faces.

Figure 2:
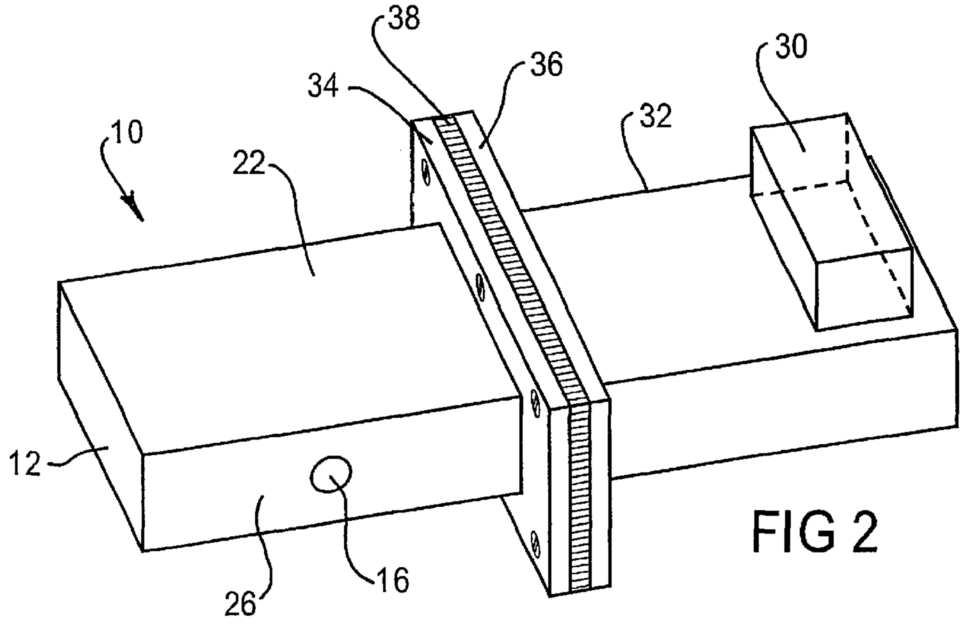
FIG. 2 illustrates a microwave generator, waveguide and cavity structure for use in the invention.

Another embodiment of the invention (see FIGS. 5 and 6) comprises a waveguide 70 within which is positioned a resonant iris 72 (provided by an opening in a metal section 78) having a plasma torch 74 located within the iris. The resonant iris 72 is positioned in waveguide 70 such that the torch 74 will be substantially axially aligned with a magnetic field maximum of the applied microwave electromagnetic field. The microwave power may be supplied to end 76 of waveguide 70 by a microwave generation means such as a magnetron (not shown, but similar to a magnetron 30 or 46 as shown in FIGS. 2 and 3 respectively).

Standard texts on microwave systems describe a number of possible sections for a resonant iris. A simple and effective example is to use a metal section 78 (see FIG. 5) where the width and height of the waveguide 70 are simultaneously reduced. The reduced height represents a capacitor and the reduced width represents an inductor. The combination of a parallel inductor and capacitor forms a resonant circuit. The approximate conditions for resonance are that the perimeter of the opening forming iris 72 be an integral number of half-wavelengths long. This is only approximate because the resonant frequency also depends on the thickness t of the section 78 (i.e. its dimension along the waveguide 70). In practice the most expedient method of finding the exact size required is to make a trial opening with the perimeter of the opening n half-wavelengths long, where n is an integer, measure the exact resonant frequency and then linearly scale the length l or height h of the opening to the exact frequency required. Ideally, such an opening should not have sharp corners since these cause undesirable field and surface current concentrations. A simple solution to this is to make the ends 80 of the opening either radiused or semicircular. As an example for the 34×74 mm waveguide described hereinbefore, a suitable opening is h=16 mm with semicircular ends 80 (that is, with 8 mm radii), and an overall length of the opening of l=43 mm. Thickness t of the section 78 is about 18 mm which is enough to accommodate the torch 74. The torch 74 is accommodated in a hole 82 in section 78 such that it passes through the middle of the iris opening 72 parallel to the dimension l. Hole 82 may be 13 mm in diameter.

Resonant iris 72 may be located substantially in the middle of a waveguide cavity 70 which is one wavelength long. However it has been found that this length of waveguide is not required in that microwave power may be fed onto iris 72 from one side with the other side opening into a shorted section of the waveguide 70. Thus the waveguide 70 can be shorted by an end plate 84 (see FIG. 6) which is conveniently located substantially one half wavelength from the axis of torch 74 (that is, distance $x=\lambda/2$). This distance $\lambda/2$ places the iris 72 (and thus torch 74) substantially at a location where the axial magnetic field is a maximum and the electric field is a minimum. Such a structure causes excitation of the plasma by both a magnetic field and an electric field (which differs from the embodiments of FIGS. 1–4 where excitation is by the magnetic field), Such excitation results in a plasma having an elliptical cross section.

Figure 5:
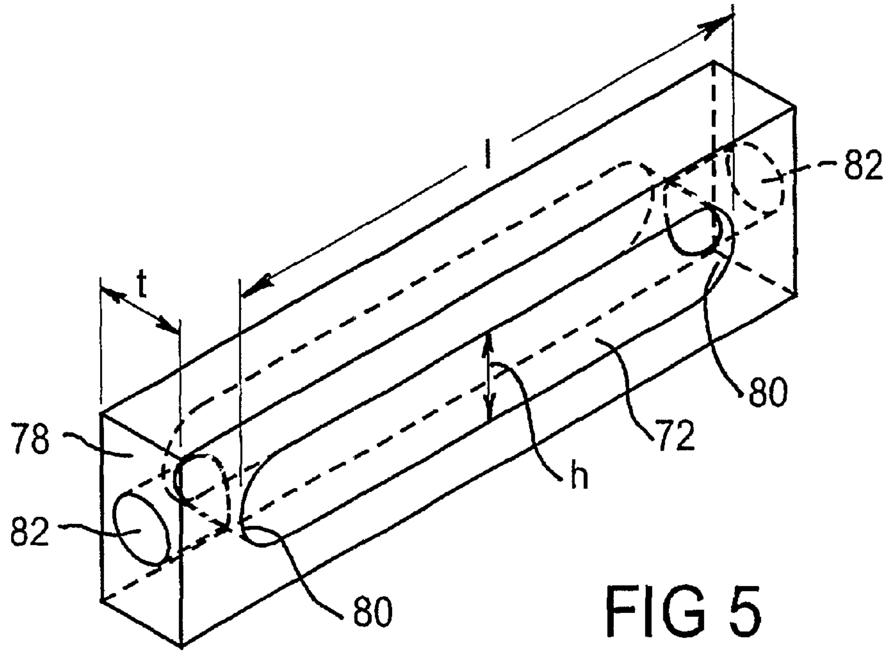
FIG. 5 illustrates a resonant iris for use in an embodiment of the invention.

An embodiment using a resonant iris 72 as in FIGS. 5–6 allows for a smaller structure than those of FIGS. 1–4. It also does not require field concentration structures such as 20 or 56. Thus a resonant iris based embodiment such as in FIGS. 5–6 is simpler and cheaper to provide than an embodiment as in FIGS. 1–4.

The skin depth which defines the region in which electrical energy is dissipated depends on the degree of conductivity of the plasma and the microwave frequency. Typically, noble gases such as helium or argon are used to sustain a plasma used for analytical purposes. Both these gases are easily ionised and as a consequence, the electrical resistivity of the resulting plasma is very low. At 2455 MHz the skin depth of an argon plasma according to the current invention has been measured as about 1 mm. This small depth can result in insufficient heating into the centre region containing the sample unless the torch is made very small. Use of a gas which exhibits a lower level of ionisation for the same plasma temperature gives a higher plasma resistivity. This in turn gives a greater skin depth improving thermal transfer to the sample-carrying core. Typically a polyatomic gas is suitable. The preferred choice is diatomic nitrogen or air due to their low cost and ease of procurement, although other gasses may also be suitable. One problem is that the ignition of the plasma is more difficult in diatomic gasses. A solution is to ignite the plasma initially on a monatomic gas such as argon and switch over to the diatomic gas (for example nitrogen) after the plasma has been created.

Another practical problem to be addressed in a microwave induced plasma apparatus according to the invention is that of thermally cooling the microwave cavity. Whilst this can be done by circulating water or air over the outside of the cavity, a particularly convenient approach is to blow cooling air through the inside of the cavity. Provision of an opening in the end of the cavity allows the hot air to escape and also serves as a viewing port to allow a visual check of plasma appearance. Leakage of microwave energy from this opening is avoided by making the opening in the form of a cylindrical tube whose length is at least 2 times the diameter. A typical opening may have a diameter of about 20 mm and a tube length of at least 40 mm. Air inlet to the system may be made via a similar opening in the magnetron launch waveguide.

A problem with conventional inductively coupled plasma torches is that the plasma tends to expand to fully fill the confinement tube, the walls of which could then melt, particularly if made of quartz. The solution to this problem is to use a gas sheathing layer to prevent the plasma contacting the walls. For a microwave induced plasma the higher frequency compared to a conventional radio frequency source of an inductively coupled plasma (ICP) exacerbates this problem. Although gas sheathing as in conventional torches may be employed, another solution is to concentrate the microwave energy in the middle of the torch instead of substantially uniformly over its full cross-sectional area. This may be achieved by using a modified resonant iris 90 as shown in FIG. 7.

Iris 90 is provided by an opening in a metal section 92 having a reduced height compared to the height h of iris 72 of FIG. 5. The height of iris 90 is reduced to less than the plasma torch diameter. A hole 94 for accommodating the plasma torch passes through the middle of the section 92. Example dimensions for an iris 90 in section 92 for accommodating a plasma torch of about 12.5 mm outer diameter are: section 92=74 mm×34 mm×18 mm thickness, iris opening 90=47.7 mm length×8 mm height with semicircular ends, hole 94=13 mm diameter.

A plasma torch for use in the invention may be similar to a known "minitorch" used for ICP applications, except for its outer tube being extended in length. Thus a torch 100 (illustrated in FIG. 8 as accommodated within a section 102 providing a resonant iris within a waveguide 103) consists of three concentric tubes 104, 106, 108. Tube 104 is the outer tube, tube 106 the intermediate tube and tube 108 the inner tube. Tube 106 includes an end portion of larger diameter to provide a narrow annular gap between tubes 104 and 106 for the passage of plasma forming gas that is supplied through an inlet 110. The narrow gap imparts a desirably high velocity to the plasma forming gas. An auxiliary gas flow is supplied to tube 106 through an inlet 112 and serves to keep a plasma 116 formed from the plasma forming gas an appropriate distance away from the nearby ends of tubes 106 and 108 so that these ends do not overheat. A carrier gas containing entrained sample aerosol is supplied to inner tube 108 through an inlet 114 and on exiting the outlet of tube 108 forms a channel 118 through plasma 116 for the sample aerosol to be vaporised, atomised and spectrochemically excited by the heat of the plasma. As is known, the diameter of inner tube 108 is chosen to match the rate of flow of carrier gas and entrained sample aerosol provided by a nebulizer (or other sample introduction means) that is used with the torch 100. The velocity of the aerosol laden carrier gas emerging from inner tube 108 must be sufficient to make a channel 118 through the plasma 116, but not so great that there is insufficient time for the aerosol to be properly vaporised, atomised and spectrochemically excited. It has been found that a nebulizer and spray chamber from a conventional inductively coupled argon plasma system performs satisfactorily with the present invention when the internal diameter of tube 108 of a torch 100 is in the range 1.5–2.5 mm.

Torch 100 may be constructed of fused quartz and have an outer diameter of approximately 12.5 mm. Its outer tube 104 may be extended in length to protrude a short distance from the waveguide 103. FIG. 8 shows a torch in which the three tubes 104, 106, 108 are permanently fused together, however a mechanical arrangement may be provided whereby the three tubes are held in their required positions and wherein one or more of the tubes can be removed and replaced, as is known. Such an arrangement is called a demountable torch. Torch 100 may be constructed of materials other than quartz, such as for example alumina, boron nitride or other heat resistant ceramics. An embodiment as in FIG. 8 readily supports an analytically useful plasma in nitrogen at power levels ranging from below about 200 watts to beyond 1 kilowatt.

The discussion hereinbefore of the background to the invention and of what is known or conventional is included to explain the context of the invention and the invention itself. This is not to be taken as an admission that any of the material referred to was part of the common general knowledge in Australia as at the priority date of the claims of this application.

The invention described herein is susceptible to variations, modifications and/or additions other than those specifically described and it is to be understood that the invention includes all such variations, modifications and/or additions which fall within the scope of the following claims.

What is claimed is:

1. A method of producing a plasma for spectrochemical analysis of a sample comprising the steps of:

supplying a plasma forming gas to a plasma torch, applying microwave power to the plasma torch, and relatively positioning the plasma torch to axially align it substantially with a magnetic field maximum of the microwave electromagnetic field, wherein the applied microwave power is such as to maintain a plasma of the plasma forming gas for heating a sample entrained in a carrier gas for spectrochemical analysis of the sample.

2. The method as claimed in claim 1, wherein microwave power of $TE_{10}$ mode is applied to the plasma torch.

3. The method as claimed in claim 1, wherein the plasma is ignited by initiating a localised break-down of the plasma forming gas within the magnetic field region to produce seeding ions.

4. The method as claimed in claim 3, wherein the localised breakdown is initiated by a spark discharge.

5. The method as claimed in claim 1, including the step of shaping the magnetic field to increase the magnetic flux concentration which passes axially of the torch.

6. The method as claimed in claim 1, wherein the plasma forming gas is a diatomic gas.

7. The method as claimed in claim 6, wherein the plasma forming gas is nitrogen.

8. The method as claimed in claim 1, wherein the plasma forming gas is air.

9. The method as claimed in claim 6, wherein the plasma is ignited with argon as the plasma forming gas, the diatomic gas being subsequently supplied to sustain the plasma.

10. The method as claimed in claim 1, wherein the plasma forming gas is argon.

11. A plasma source for a spectrometer comprising:

microwave generation means for generating microwave power, a waveguide for receiving and supplying the microwave power, and a plasma torch having passages for supply of respectively at least a plasma gas and a carrier gas with entrained sample, wherein the plasma torch is positioned relative to the waveguide such that it is substantially axially aligned with a magnetic field maximum of the microwave electromagnetic field for excitation of a plasma of the plasma forming gas for heating the sample for spectrochemical analysis.

12. The plasma source as claimed in claim 11, wherein the waveguide is for supplying microwave power in the $TE_{10}$ mode.

13. The plasma source as claimed in claim 11, wherein the waveguide is a resonant cavity for the supplied microwave power.

14. The plasma source as claimed in claim 11, comprising field concentration structures within the waveguide for shaping the magnetic field to increase the magnetic flux which passes axially of the torch.

15. The plasma source as claimed in claim 14, wherein the field concentration structures are metallic bars aligned parallel with the plasma torch and which span opposite inside walls of the waveguide in contact therewith.

16. The plasma source as claimed in claim 15, wherein the metallic bars are triangular in cross section with the apexes directed inwardly of the waveguide towards the plasma torch.

17. The plasma source as claimed in claim 11, wherein the microwave power is supplied to the plasma torch via an inductive or capacitive element contained in the waveguide located between the microwave generation means and the plasma torch.

18. The plasma source as claimed in claim 17, wherein the inductive element is formed by a conductive post which spans opposite surfaces of the waveguide.

19. The plasma source as claimed in claim 11, comprising a structure within the waveguide which provides a resonant iris, wherein the torch is located relative to this structure such that the microwave electromagnetic field at the resonant iris excites a plasma of the plasma forming gas, wherein said structure and thereby said plasma torch are positioned relative to the waveguide such that the torch is substantially axially aligned with a magnetic field maximum of the microwave electromagnetic field.

20. The plasma source as claimed in claim 19, wherein said structure is a metal section having a thickness dimension along the waveguide and which defines an opening across said thickness dimension to provide said resonant iris by reducing a width and a height of the waveguide, wherein the opening has a length and a height and the plasma torch axially spans the length of the opening.

21. The plasma source as claimed in claim 20, wherein the plasma torch is accommodated within a hole which passes through the metal section and intersects said resonant iris opening.

22. The plasma source as claimed in claim 19, wherein the resonant iris has a height which is less than the outer diameter of the plasma torch for concentrating the microwave energy substantially towards the central axis of the plasma torch.

23. The plasma source as claimed in claim 11, wherein the plasma torch comprises an outer tube and an intermediate tube providing a passage therebetween for supply of the plasma gas, and an inner tube within the intermediate tube for supply of the carrier gas with entrained sample, wherein the outer tube extends in length beyond the intermediate and inner tubes.

24. The plasma source as claimed in claim 23, wherein the outer tube extends to protrude a short distance from the waveguide.

25. A waveguide for a microwave comprising:

a plasma source for spectrochemical analysis of a sample, wherein the waveguide is dimensioned to operate in the $TE_{10}$ mode and includes apertures for accommodating a plasma torch, wherein the apertures are located such that in use a plasma torch located in the waveguide and extending through said apertures will be axially aligned with a magnetic field maximum of the microwave electromagnetic field.

26. The waveguide as claimed in claim 25, wherein the waveguide includes structures for concentrating the magnetic field strength at the plasma torch location.

27. The waveguide as claimed in claim 26, wherein said structures are oppositely located conducting bars which contact opposite facing surfaces of the waveguide and reduce the height dimension of the waveguide in parallel alignment with the axial direction of the plasma torch location.

28. The waveguide as claimed in claim 27, wherein the conducting bars have a triangular cross section with the apexes directed inwardly towards each other.

29. The waveguide as claimed in claim 25, wherein the waveguide includes a structure which defines a resonant iris, wherein said structure includes a through hole for accommodating a plasma torch, the through hole being aligned with said apertures.

30. The waveguide as claimed in claim 29, wherein said structure defines an opening to provide said resonant iris by reducing a width and a height of the waveguide, wherein the resonant iris opening intersects said through hole.

31. A plasma source for a spectrometer comprising:

a waveguide containing a resonant iris, and a plasma torch associated with the resonant iris such that a microwave electromagnetic field can be applied to the resonant iris via the waveguide and for a magnetic field maximum of the electromagnetic field in the resonant iris to be substantially axially aligned with the plasma torch for exciting a plasma in a plasma forming gas that passes through the plasma torch.

32. The plasma source as claimed in claim 31, wherein the resonant iris is a metal section that contains a through hole, the plasma torch being accommodated in the through hole.

33. The plasma source as claimed in claim 11, wherein the waveguide includes at least one hole in an end thereof for passage of cooling air through the waveguide and to provide a viewing port for visual inspection of a plasma formed by the plasma torch.

* * * * *